(12) United States Patent
Coers et al.

(10) Patent No.: US 7,677,588 B2
(45) Date of Patent: Mar. 16, 2010

(54) HITCH ASSEMBLY WITH A GUIDE ELEMENT

(75) Inventors: Bruce Alan Coers, Hillsdale, IL (US); Mark Michael Chaney, Geneseo, IL (US)

(73) Assignee: Deere & Company, Moline, IL (US)

( * ) Notice: Subject to any disclaimer, the term of this patent is extended or adjusted under 35 U.S.C. 154(b) by 553 days.

(21) Appl. No.: 11/588,039

(22) Filed: Oct. 26, 2006

(65) Prior Publication Data

US 2008/0116657 A1 May 22, 2008

(51) Int. Cl.
*B60D 1/40* (2006.01)
(52) U.S. Cl. ............... 280/478.1; 280/477; 280/491.2; 280/475
(58) Field of Classification Search ............. 280/477, 280/475, 479.3, 478.1, 491.2
See application file for complete search history.

(56) References Cited

U.S. PATENT DOCUMENTS

| | | | |
|---|---|---|---|
| 2,871,029 A | | 1/1959 | Demarest |
| 3,521,908 A | | 7/1970 | Carter |
| 3,860,267 A | | 1/1975 | Lyons |
| 3,912,018 A | * | 10/1975 | Brundage et al. ............ 172/328 |
| 3,981,517 A | * | 9/1976 | Crochet, Sr. ............ 280/478.1 |
| 4,609,203 A | | 9/1986 | Steilen |
| 4,723,787 A | * | 2/1988 | Hadley et al. ............... 172/311 |
| 4,792,153 A | | 12/1988 | Galdes |
| 5,009,446 A | | 4/1991 | Davis |
| 5,011,176 A | | 4/1991 | Eppinette |
| 5,997,024 A | | 12/1999 | Cowley |
| 6,209,297 B1 | | 4/2001 | Yeomans et al. |
| 6,293,352 B1 | * | 9/2001 | Hundeby et al. ............ 172/456 |
| 6,328,326 B1 | | 12/2001 | Slatten |
| 6,360,516 B1 | | 3/2002 | Harkcom |
| 6,405,806 B1 | | 6/2002 | Bernhardt et al. |
| 6,663,132 B1 | * | 12/2003 | Kizy ....................... 280/479.1 |
| 6,663,134 B2 | * | 12/2003 | Paluch et al. ............. 280/491.2 |
| 6,691,794 B2 | * | 2/2004 | Paluch et al. ................ 172/679 |
| 6,951,346 B2 | * | 10/2005 | Brackett et al. ......... 280/491.2 |
| 7,025,008 B2 | * | 4/2006 | Fischer ....................... 111/52 |
| 7,293,791 B1 | * | 11/2007 | Williams, Jr. ............ 280/478.1 |
| 2001/0024027 A1 | * | 9/2001 | Landoll et al. ............. 280/477 |
| 2004/0239073 A1 | | 12/2004 | Goettker |

FOREIGN PATENT DOCUMENTS

| | | |
|---|---|---|
| DE | 813098 C | 9/1951 |
| DE | 3042160 | 6/1982 |
| DE | 19922770 A1 | 12/2000 |
| EP | 0176442 A | 4/1986 |
| FR | 2806760 A | 9/2001 |
| GB | 2218890 | 11/1989 |

OTHER PUBLICATIONS

European Search Report dated Mar. 3, 2008, (5 pages).

* cited by examiner

*Primary Examiner*—Lesley Morris
*Assistant Examiner*—Tashiana Adams

(57) ABSTRACT

A hitch assembly comprises a first coupling element and a second coupling element suited to be latched to the first coupling element. A rod member has a first end connected to the first coupling element. An actuator has a movable output member that can move between a retracted and an extended position.

16 Claims, 2 Drawing Sheets

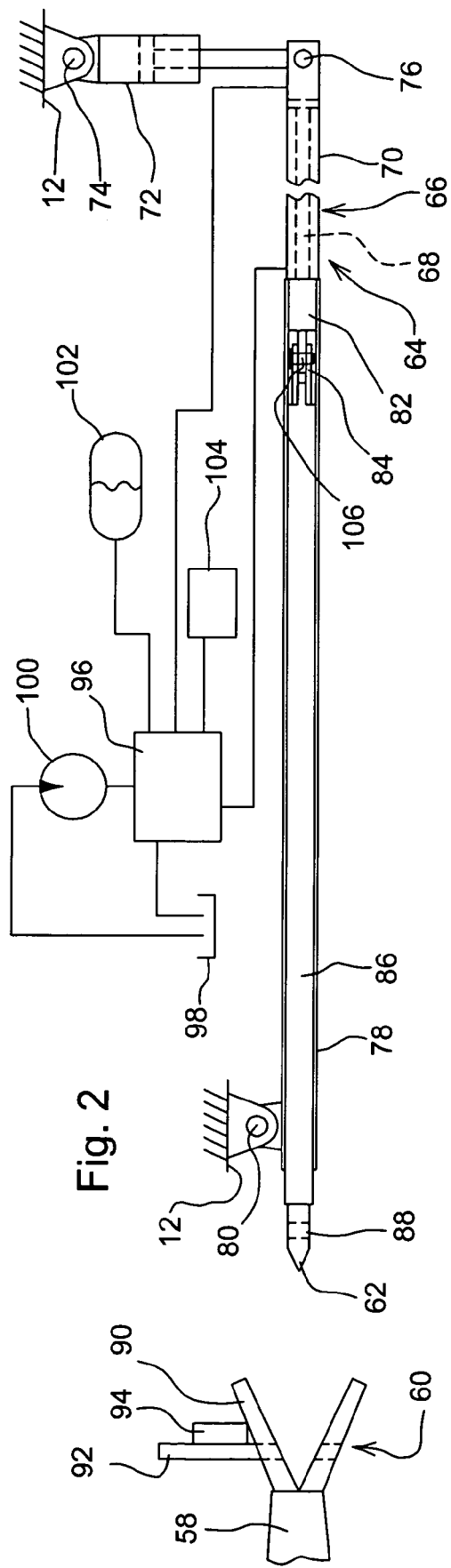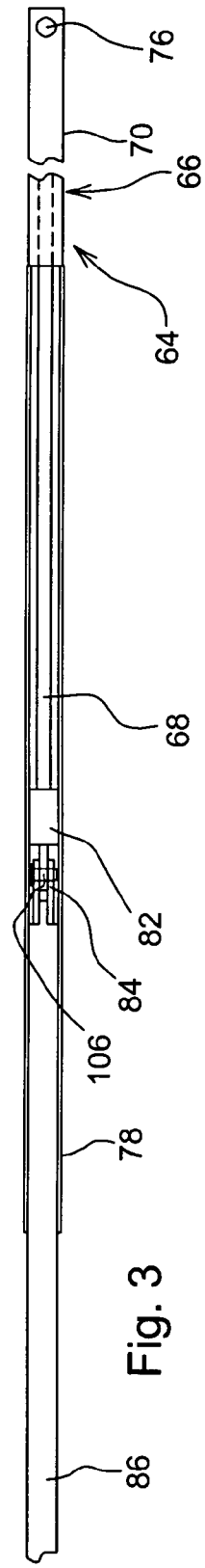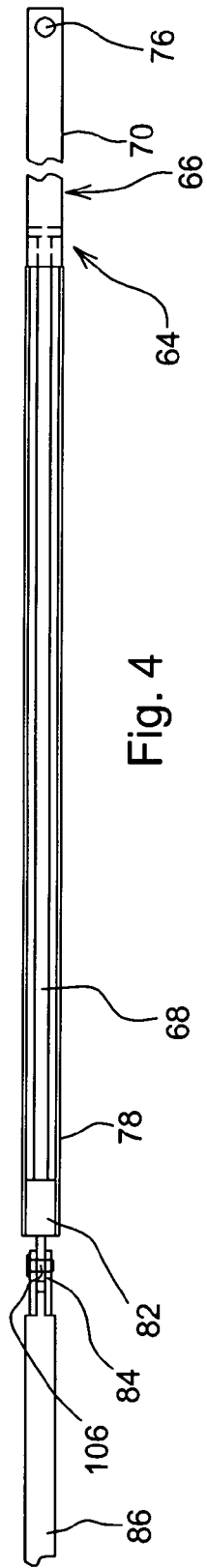

HITCH ASSEMBLY WITH A GUIDE ELEMENT

FIELD OF THE INVENTION

The present invention relates to a hitch assembly comprising a first coupling element and a second coupling element that can be latched together, wherein the first coupling element is movable towards the second coupling element by means of an actuator.

BACKGROUND OF THE INVENTION

Coupling a towing vehicle and a towed vehicle together is in many cases a difficult task. Generally, the towed vehicle has a tongue with an eye at its tip and the towing vehicle has a hitch. Thus, the towing vehicle needs to be driven rearwards in a manner such that the tongue correctly hits the hitch. This is a difficult task even when the driver is supported by a camera looking rearwards and a display showing the hitch and the tip of the tongue. After the tongue is located in the hitch, the operator needs to leave his operator's cab and lock the hitch manually.

A number of proposals were made with hitches having movable elements allowing the operator to place the towing vehicle in the vicinity of the towed vehicle and to manually move the movable element of the hitch towards the towed vehicle. Afterwards, the towing vehicle is headed forwardly and then the hitch is arrested in a transport position. This requires the operator to leave his cab twice.

In the context of agricultural tractors, hitches with actuators for altering the length of the hitch have been described for providing a connection to pulled implements.

The task of coupling a towing vehicle and a trailed vehicle together is difficult especially in agricultural harvesting conditions with uneven terrain, when a combine and a cart supporting the header of the combine need to be coupled together.

Thus, there is a need for an improved hitch assembly making coupling of two vehicles easier.

It is an object of the present invention to provide a hitch assembly that can be easily used.

SUMMARY OF THE INVENTION

The invention proposes a hitch assembly with a first coupling element and a second coupling element suited to be latched to the first coupling element. A rod member extends longitudinally relative to a supporting vehicle and has a first end connected to the first coupling element. An actuator has a movable output member that can move between a retracted and an extended position. The output member is connected to the second end of the rod member via a pivot element defining a vertical pivot axis. A guide element is arranged to accommodate the pivot element and at least a part of the length of the rod member (or the entire rod member) are located within the guide element when the actuator is in the retracted position and the rod member is located outside the guide element when the actuator is in the extended position.

Thus, the guide element guides the rod member longitudinally when the actuator moves the first coupling element towards the second coupling element. The pivot element allows a pivot movement of the first coupling element with respect to the actuator about the vertical pivot axis when the actuator is in the extended position.

It is an advantage of the invention that the towing vehicle only needs to be placed in an appropriate position with respect to the towed vehicle. Then, the actuator can be moved from the retracted position towards the extended position until it reaches an intermediate position. During this movement, the first coupling element is guided at least in a lateral, horizontal direction since the rod member is abutting the guide element. The first coupling element is then latched to the second coupling element, preferably automatically or by another remotely controlled actuator, such that the operator does not need to leave his cab. Finally, the actuator is brought into the extended position, thus moving the rod member outside the guide element. The pivot element is then free to pivot about the vertical axis, such that the rod member, the coupling elements and the towed vehicle can follow steering motions of the towing vehicle.

A support member closely fitting the inside dimensions of the guide element is preferably attached to provide a solid mount for the hitch assembly when the actuator is in the extended position.

BRIEF DESCRIPTION OF THE DRAWINGS

FIG. 2 is a schematic side view of a hitch assembly according to the invention wherein the actuator is in the retracted position.

FIG. 3 is a view of the hitch assembly of FIG. 2 wherein the actuator is in an intermediate position.

FIG. 4 is a view of the hitch assembly of FIG. 2 wherein the actuator is in an extended position.

DESCRIPTION OF THE PREFERRED EMBODIMENT

Figure 1:
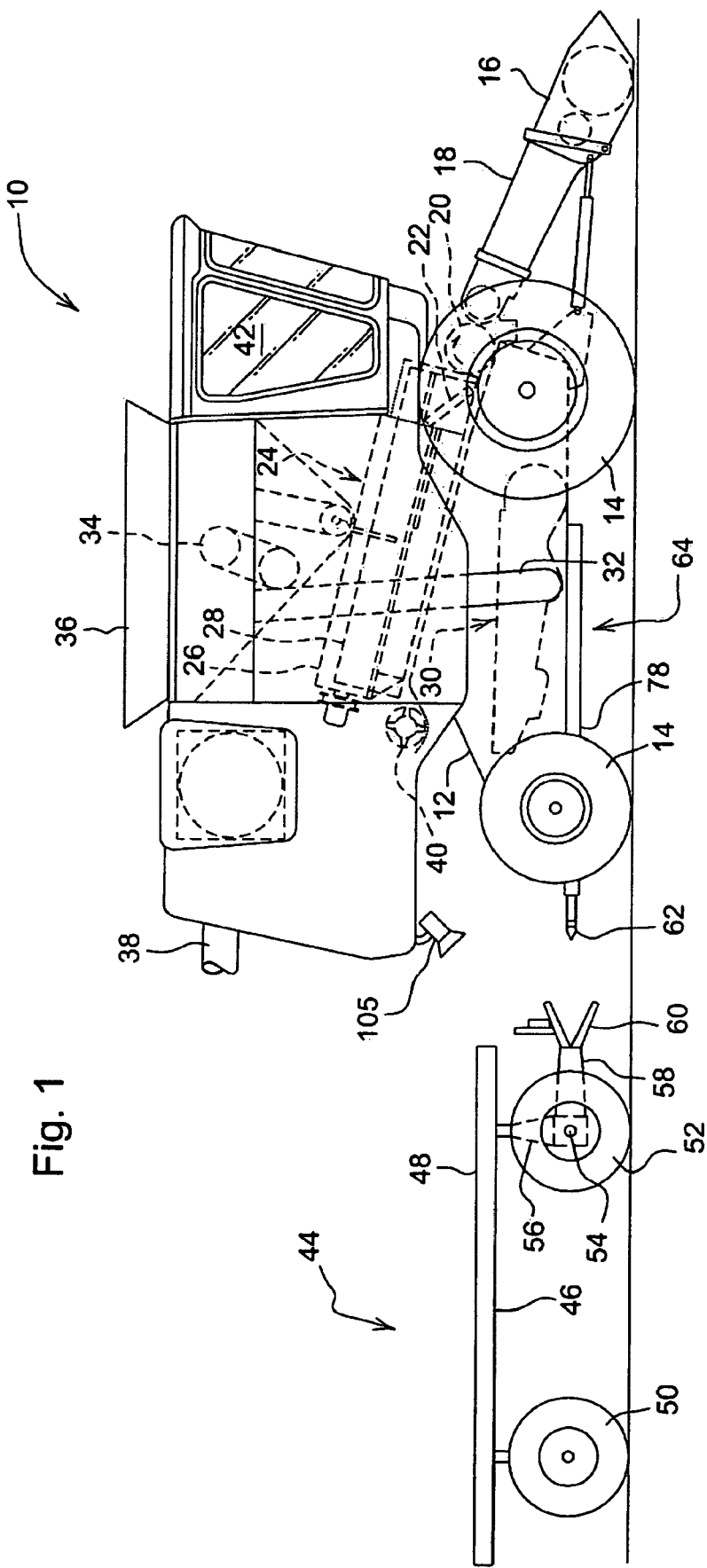
FIG. 1 is a diagrammatic side view of a towing vehicle in the form of an agricultural combine and a towed vehicle in the form of a transport cart for the header of the combine.

FIG. 1 is a diagrammatic depiction of a towing vehicle 10 and a towed vehicle 44. In the embodiment shown, towing vehicle 10 is in the form of an agricultural combine. Although the invention is being described as being incorporated into a combine, it is contemplated that the present invention may be used with other types of agricultural machines, like forage harvesters, cotton pickers and self propelled balers.

Towing vehicle 10 includes a supporting structure 12. A propulsion unit 14, which may include tires and/or tracks that engage the ground, is coupled to supporting structure 12, and performs propulsion and steering functions. A harvesting header 16 is used for harvesting a crop and directing the crop to a feederhouse 18. The harvested crop is directed during harvesting operation by feederhouse 18 to a beater 20. Beater 20 directs the harvested crop upwardly through an inlet transition section 22 to an axial crop processing unit 24. Axial crop processing unit 24 is located between, and supported by the side sheets of towing vehicle 10. Axial crop processing unit 24 includes an axial rotor housing 26 and an axial rotor 28 located in axial rotor housing 26. The harvested crop enters axial rotor housing 26 through inlet transition section 22. Axial rotor 28 is provided with an infeed portion, a threshing portion and a separating portion. Axial rotor housing 26 has a corresponding infeed section, a threshing section and a separating section.

Both crop processing portions, the threshing portion and the separating portion, are provided with crop engaging assemblies. The threshing section of the axial rotor housing 26 is provided with a concave and the separating section is provided with a grate. Grain and chaff released from the crop mat falls through the concave and the grate. The concave and grate prevent the passage of crop material larger than grain or chaff from entering a cleaning system 30.

Grain and chaff falling through the concave and grate is directed to cleaning system 30 which removes the chaff from the grain. The clean grain is then directed by a clean grain elevator 32 to a fountain auger 34. Fountain auger 34 directs the grain into a grain tank or grain compartment 36. The grain is removed from the grain tank 36 by an unloading auger 38.

As the crop residue, e.g., straw, stalks, chaff, dust, etc., reaches the end of the crop processing unit 24 it is expelled through an outlet to a beater 40. Beater 40 propels the crop residue out the rear of the combine. Downstream the beater 40, a straw chopper (not shown) could be provided. The operation of towing vehicle 10 is controlled from an operator's cab 42.

The towed vehicle 44 is in the depicted embodiment a transport cart configured to receive the header 16. Before the towing vehicle 10 can drive on public roads, the header 16 needs (at least in a number of countries) to be placed on the towed vehicle 44 in order to reduce the transport width of the towing vehicle 10 to a permissible value. Further, the load on the front axle of the propulsion unit 14 is then reduced. In another embodiment of the invention, the towed vehicle 44 can be a header with a frame that is supported on removable or movable wheels as described for example in U.S. Pat. No. 6,209,297, the contents of which are incorporated herein by reference.

Towed vehicle 44 comprises a frame 46 comprising a platform 48 on which the header 16 can be laid down. Frame 46 is supported during road transport on rear wheels 50 that are coupled to frame 46 in a non-steerable manner, and on front wheels 52 mounted to an axle 54 that is pivotally mounted to frame 46 around a vertical pivot axis 56. The axle 54 is connected to a forwardly extending tongue 58 carrying at its forward end a second coupling element 60 that is arranged to be latched or locked to a first coupling element 62 provided on the towing vehicle 10. FIG. 2 shows a side view of a hitch assembly that is used to couple the towing vehicle 10 to the towed vehicle 44 for road transport. The hitch assembly comprises an actuator 64 in the form of a hydraulic cylinder 66 having a movable output member 68 in the form of a piston rod of the hydraulic cylinder 66. Hydraulic cylinder 66 further comprises a housing 70 accommodating the piston rod. Housing 70 is at the bottom end of the hydraulic cylinder 66 connected to a remotely controlled drive means 72. The remotely controlled drive means 72 is in the described embodiment another hydraulic cylinder, the housing thereof coupled to the supporting structure 12 of the towing vehicle 10 at a pivot pin 74 with a horizontal pivot axis extending transversely to the forward direction of towing vehicle 10 and connected the piston rod of the remotely controlled drive means 72 coupled to the housing 70 of the hydraulic cylinder 66 at a pivot pin 76 with a horizontal pivot axis extending transversely to the forward direction of towing vehicle 10. The remotely controlled drive means 72 could also comprise an electric motor instead of the hydraulic cylinder. Analogously, actuator 64 could comprise an electric motor instead of hydraulic cylinder 66.

The housing 70 of the hydraulic cylinder 66 is connected to an elongate tubular guide element 78 extending coaxially to housing 70 and mounted (for example welded) to the piston rod side end of housing 70. The cross section of the guide element can be circular or rectangular, especially squared, or be of any other polygonal shape. Guide element 78 is connected to the supporting structure 12 of towing vehicle 10 at its end remote from the cylinder by a pivot pin 80 with a horizontal pivot axis extending transversely to the forward direction of towing vehicle 10. The orientation of actuator 64 and guide element 78 can thus be changed by means of the remotely controlled drive means 72.

The outer end of the output member 68 is connected to a support member 82 located inside the guide element 78 and abutting the interior surface of the guide element 78. Support member 82 is connected on its side facing away from output member 68 to a pivot element 84 connecting support member 82 to a second end of an elongate rod member 86 that extends over the length of guide element 78. Pivot element 84 provides a vertical pivot axis around which rod member 86 can rotate when it is moved by actuator 64 outside the guide element 78. Rod member 86 is at its first end connected to the first coupling element 62.

As shown in FIG. 1, the first coupling element 62 is located at the rear of towing vehicle 10. The towing vehicle 10 mounted parts of the hitch assembly extend from the first coupling element 62 in the forward direction towards the forward end of towing vehicle 10.

The first coupling element 62 has a shape tapered towards the rear and a vertically extending hole 88. The second coupling element 60 comprises a funnel 90 for easily threading in the first coupling element 62. Second coupling element 60 further comprises a vertically extending latch pin 92 that can be vertically moved by a latching pin actuator 94. Once the first coupling element 62 is caught in funnel 90, latching pin 92 can be moved downwards by actuator 94 to extend through hole 88 and to latch the coupling elements 60, 62 together. Actuator 94 is electrically driven by a solar cell supported battery provided on the towed vehicle 44 and can be controlled from the operator's cab 42 via a radio communication link.

The two chambers of the hydraulic cylinder 66 of actuator 64 are connected to a valve assembly 96 that is further connected to a hydraulic reservoir 98, a hydraulic pump 100 and an accumulator 102. Valve assembly 96 can be controlled from operator's cab 42 by an input device 104 comprising keys or other suitable input means that can be actuated by the operator. Input device 104 can also be used to control the remotely controlled drive means 72 via another valve assembly (not shown) constructed the same and coupled to pump 100, accumulator 102, reservoir 98, and input device 104 in the same manner.

As shown in FIGS. 3 and 4, actuator 64 can move rod member 86 from the retracted position displayed in FIG. 2 into an intermediate position as shown in FIG. 3, in which the forward part of rod member 86 is still within the guide element 78 and pivot element 84 is thus still locked, and into an extended position shown in FIG. 4 in which entire rod member 86 is outside of guide element 78 and rod member 86 and first coupling element 62 are free to rotate around the vertical pivot axis provided by pivot element 84.

The operation of the towing vehicle 10 is as follows.

In the situation as shown in FIG. 1, the header 16 is mounted to the towing vehicle 10. The latter can thus be used for harvesting grain from a field. When harvesting operation ends or the towing vehicle 10 is to be driven on a public road to a farm or another field to be harvested, the operator drives the towing vehicle 10 into a position in which header 16 can be placed upon platform 48 of the towed vehicle 44, after lifting the feederhouse 18. Then, feederhouse 18 is lowered such that the header 16 lies on the platform 48. Mechanical, electrical and hydraulic connections between the feederhouse 18 and the header 16 are then removed, either manually by the operator or using appropriate actuators.

In the next step, towing vehicle 10 is driven to a position as shown in FIG. 1 (but the header 16 now lies on platform 48).

The towing vehicle 10 is thus brought into a position in which the first coupling element 62 can be moved into the second coupling element 60. The operator can get assistance from a camera 105 at the rear of the towing vehicle 10 and a display showing the image received by the camera 105 that is located in the operators cab 42. If it is difficult to move the towing vehicle 10 into the appropriate position, operator can use input device 104 to actuate the remotely controlled drive means 72 to better align both coupling elements 60, 62 in the vertical plane. In another embodiment, another remotely controlled drive means 72 and valve assembly 96 could be provided to alter the vertical position of pivot pin 80 and/or the orientation and/or position of actuator 64 and guide element 78 in the horizontal plane. The guide element 78 is thus in a defined position with respect to the support structure 12 of the towing vehicle 10.

Then, operator can use input device 104 to command actuator 64 via valve assembly 96 to move output element 68, rod member 86 and first coupling element 62 to the rear towards the second coupling element 60. The towing vehicle 10 is positioned such that first coupling element 62 is aligned with second coupling element 60 when the actuator 64 is more or less close to the intermediate position depicted in FIG. 2. Thus, via the entire described motion of actuator 64 into the intermediate position, rod member 86 is supported and guided both in vertical and horizontal direction in guide element 78. Now, the operator can instruct latching pin actuator 94 to move latch pin 92 into hole 88 of the first coupling element 62 such that the latter is locked to the second coupling element 60 and the towed vehicle 44 is coupled to the towing vehicle 10. In another embodiment, the coupling elements 60, 62 are automatically latched together once first coupling element 62 is located within the second coupling element 62.

In the next step, the towing vehicle 10 is moved forwardly. The valve assembly 96 is instructed by the operator via input device 104 (or automatically by a suitable control unit) to bring hydraulic cylinder 66 into a floating mode, to allow it to extend to the extended position according to FIG. 4. In another embodiment, actuator 64 could be actively brought into the extended position, thus moving the towed vehicle 44 rearwards.

The combination of towing vehicle 10 and towed vehicle 44 is now ready for road transport. Since rod member 86 is outside the guide element 78, it can pivot around the vertical axis provided by pivot element 84. Hence, rod member 86, the coupling elements 60, 62 and the front axle 54 of towed vehicle 44 can follow steering motions of the towing vehicle 10. A relative motion between coupling elements 60, 62 is thus not necessary. In another embodiment, pivot element 84 could also allow at least a restricted a pivot motion around a horizontal axis extending transversely to the forward direction of the towing vehicle 10. Pivot element 84 could thus be replaced by a ball joint. Support member 82 closely fitting the inside dimensions of the guide element 78 now provides a solid mount for the output member 68 within guide element 78. During driving, one or both chambers of hydraulic cylinder 66 can be connected to accumulator 102. Accumulator 102 then provides a damping function to reduce shock on the towing vehicle 10 and on the towed vehicle 44 when accelerating or decelerating. For this purpose, actuator 64 can be retracted into a position between those of FIGS. 3 and 4 to provide an evasion path.

For harvesting another field, towed vehicle 44 can be placed at a suitable location. Then, the operator in the operator station 42 instructs latching pin actuator 94 to move latch pin 92 upwardly out of hole 88 of the first coupling element 62 such that the latter is unlocked from the second coupling element 60 and the towed vehicle 44 is uncoupled from the towing vehicle 10. Actuator 64 is brought into the refracted position according to FIG. 2, such that there are no parts of the hitch assembly rearward of a normal combine hitch. The towing vehicle 10 is then placed at the side of towed vehicle 44 for mounting header 16 to feederhouse 18. Mechanical, electrical and hydraulic connections between the feederhouse 18 and the header 16 are then closed, either manually by the operator or using appropriate actuators. Finally, feederhouse 18 is lifted and the towing vehicle 10 is ready for harvesting. A vertical pin 106 of pivot element 84 can be removed to remove rod member 86 and the first coupling element 62. Then, a towed vehicle 44 not having the second coupling element 60 (but a tongue with a normal eyelet) can be transported by using a normal combine hitch of towing vehicle 10.

Having described the preferred embodiment, it will become apparent that various modifications can be made without departing from the scope of the invention as defined in the accompanying claims.

The following is claimed:

1. A hitch assembly comprising:
   a longitudinally extending first coupling element;
   a second coupling element configured to be latched to the first coupling element;
   a rod member having a length disposed longitudinally, a first end and a second end, the first end being connected to the first coupling element;
   an actuator with a longitudinally movable output member arranged to move between a retracted and an extended position, the output member being connected to the second end of the rod member via a pivot element defining a vertical pivot axis; and
   a longitudinally extending guide element arranged for selectively simultaneously embracing the pivot element and at least a part of the length of the rod member so as to prevent pivoting of said rod member about said vertical axis;
   wherein the pivot element and the part of the length of the rod member are embraced by the guide element when the actuator is in the retracted positions and the pivot element and rod member are free of the guide element when the actuator is in the extended position,
   such that the guide element guides the rod member longitudinally when the actuator moves the first coupling element towards the second coupling element and such that the pivot element allows a pivot movement of the first coupling element with respect to the actuator about the vertical pivot axis only when the actuator is in the extended position.

2. A hitch assembly according to claim 1, wherein the output member of the actuator is connected to a support member, which in turn is, connected directly to said pivot element and is at all times embraced and supported by the guide element.

3. A hitch assembly according to claim 1, wherein the actuator comprises a housing being in lengthwise alignment with, and connected to, the guide element.

4. A hitch assembly according to claim 3, wherein the actuator comprises a hydraulic cylinder having a piston rod within the housing, the piston rod being connected to the pivot element.

5. A hitch assembly according to claim 2, wherein the guide element comprises a hollow tube and said rod member and support member each being shaped complementary to and received within, said guide element when said actuator is retracted, such that the guide element guides the rod member in the direction when the actuator moves the first coupling element towards the second coupling element.

6. A hitch assembly according to claim 1, wherein the second coupling element is mounted to a towed vehicle and the actuator is mounted to a towing vehicle.

7. A combination according to claim 1, wherein the first coupling element can be latched to the second coupling element while the rod member is in an intermediate position, with the guide element still embracing the rod member.

8. A combination of a towing vehicle and a towed vehicle that can be coupled together with a hitch assembly, the hitch assembly comprising:
   a first coupling element;
   a second coupling element configured to be latched to the first coupling element;
   a rod member having a length, a first end and a second end, the first end being connected to the first coupling element;
   an actuator with a movable output member arranged to move between a retracted and an extended position, the output member being connected to the second end of the rod member via a pivot element defining a vertical pivot axis; and
   a longitudinally extending guide element arranged for selectively simultaneously embracing the pivot element and at least a part of the length of the rod member so as to prevent pivoting of said rod member about said vertical axis;
   wherein the pivot element and the part of the length of the rod member are embraced by the guide element when the actuator is in the retracted position, and the pivot element and rod member are free of the guide element when the actuator is in the extended position,
   such that the guide element guides the rod member longitudinally when the actuator moves the first coupling element towards the second coupling element and such that the pivot element allows a pivot movement of the first coupling element with respect to the actuator about the vertical pivot axis only when the towing vehicle tows the towed vehicle and the actuator is in the extended position.

9. A combination according to claim 8, wherein the first coupling element can be latched to the second coupling element while the rod member is in an intermediate position, with the guide element still embracing the rod member.

10. A combination according to claim 8, wherein the guide element is tubular and the output member of the actuator is connected to a support member shaped complementary to and located within the guide element.

11. A combination according to claim 8, wherein the actuator comprises a housing disposed in longitudinal alignment with, and connected to, the guide element.

12. A combination according to claim 11, wherein the actuator comprises a hydraulic cylinder having a piston rod within the housing, the piston rod being connected to the pivot element.

13. A combination according to claim 12, and further including an accumulator coupled to said hydraulic cylinder via a control valve wherein the hydraulic cylinder can be connected to the accumulator to provide a damping function to reduce shock on the towing vehicle and on the towed vehicle when accelerating or decelerating.

14. A combination according to claim 8, wherein the guide element has a first end region remote from said actuator which is mounted to said towing vehicle for pivoting about a horizontal axis; a remotely controlled drive means being connected to said guide element for selectively pivoting said guide element in a vertical direction about said horizontal axis responsive to operation of said drive means.

15. A combination according to claim 8, wherein the towing vehicle is a combine and the towed vehicle is one of a header transport cart and a header with wheels.

16. A combination according to claim 8, wherein the towing vehicle comprises a frame to which an end region of said guide element remote from said actuator is connected for pivoting about a horizontal axis; and a remotely controlled drive means being coupled to said actuator, whereby the orientation and position of the actuator and the guide element with respect to the frame and said second coupling element can be altered by operation of said remotely controlled drive means.

* * * * *